United States Patent [19]

Ciordinik et al.

[11] Patent Number: 4,721,131

[45] Date of Patent: Jan. 26, 1988

[54] CONTROL DEVICE FOR VALVES AND THE LIKE

[75] Inventors: Jacques Ciordinik; Federico Ciordinik, both of Bologna, Italy

[73] Assignee: CI.KA.RA. S.p.A., Italy

[21] Appl. No.: 18,698

[22] Filed: Feb. 25, 1987

[30] Foreign Application Priority Data

Feb. 26, 1986 [IT] Italy ............................ 12436 A/86
Aug. 26, 1986 [IT] Italy ............................ 12534 A/86

[51] Int. Cl.$^4$ ............................................ F16K 37/00
[52] U.S. Cl. ................................ 137/554; 200/61.62; 251/266; 340/556; 340/652
[58] Field of Search .............. 137/554; 200/61.62; 251/229, 266, 267; 340/508, 555, 556, 652

[56] References Cited

U.S. PATENT DOCUMENTS

| | | | |
|---|---|---|---|
| 1,734,419 | 11/1929 | Chitty | 137/554 |
| 1,790,009 | 1/1931 | Karnath | 137/554 |
| 1,952,397 | 3/1934 | Tuner | 137/554 |
| 3,007,489 | 11/1961 | Biddle | 137/554 |
| 3,522,596 | 8/1970 | Fowler et al. | 137/554 |
| 3,714,644 | 1/1973 | Hellstrom | 340/508 |
| 4,518,008 | 5/1985 | Fenster et al. | 137/554 |

FOREIGN PATENT DOCUMENTS 0203498 3/1986 European Pat. Off. .

0117974 7/1984 Japan .................... 137/554

Primary Examiner—George L. Walton
Attorney, Agent, or Firm—King and Schickli

[57] ABSTRACT

A control device for valves and the like, including at least one control switch (13) which is inserted in at least one optical conductor (18,118), and is connected to the valve actuating means in such a manner that it will be automatically actuated (i.e. opened or closed) upon the actuation (i.e. opening or closing) of the valve, thus interrupting the respective conductor (18,118) or re-establishing its continuity. The conductor (18,118) is comprised in a warning and/or control circuit, and the opening or the closing of said switch (13) generates a signal which may be utilized, for example, to detect and/or to record the actuation of the valve and/or to activate a television inspection system. The control switch (13) is formed by a connector for optical fibre and comprises two complementary and co-axial connector members (14,15) one of which (14) is stationary and the other of which (15) is movable axially and is urged towards one of its end positions (i.e. opening or closing position) by a spring (17) and is held in the other end position thereof (i.e. closing or opening position) by an associated movable portion (2) of the valve actuating means, in the position assumed by said portion at the end of its stroke for closing or opening the valve.

19 Claims, 8 Drawing Figures

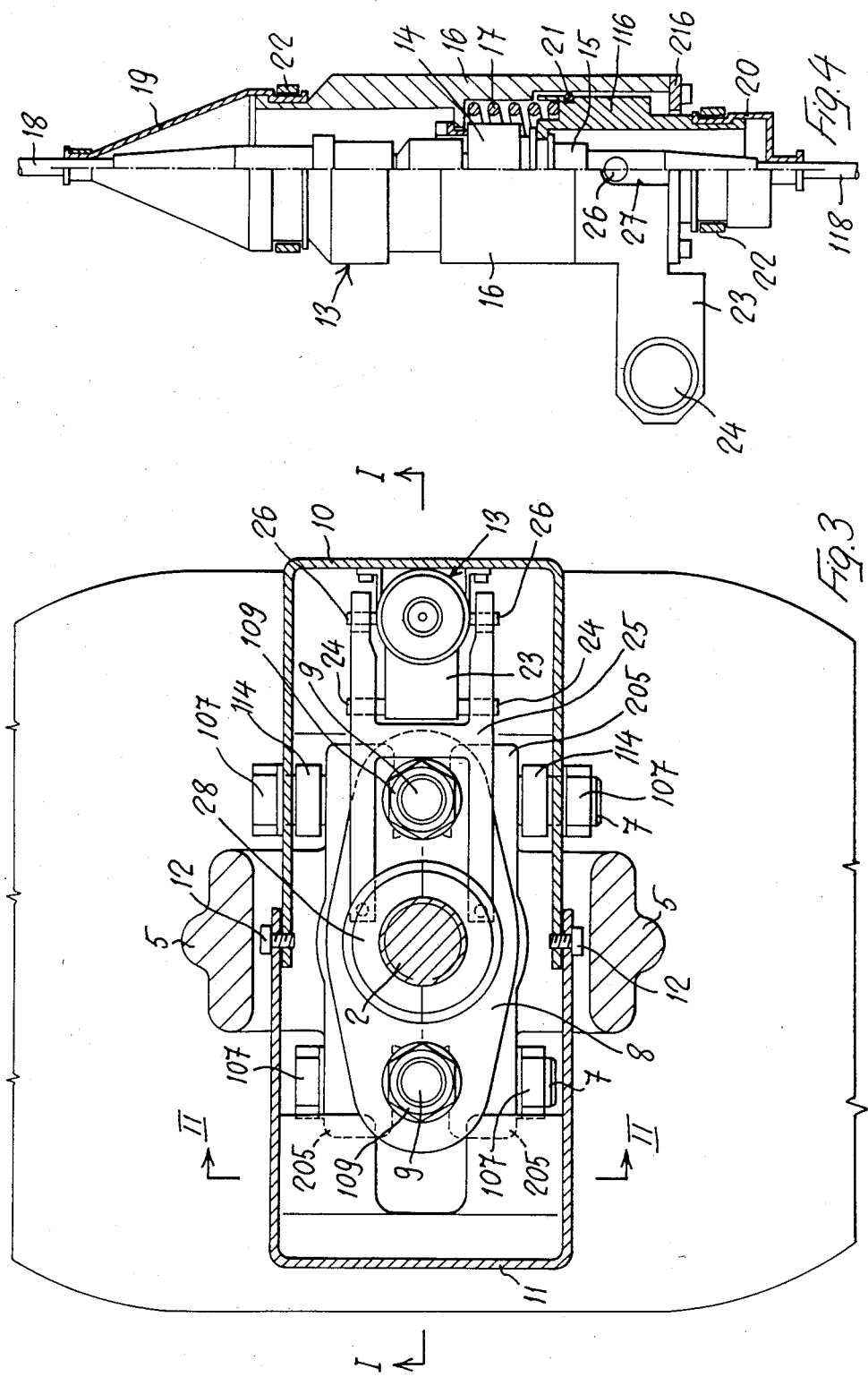

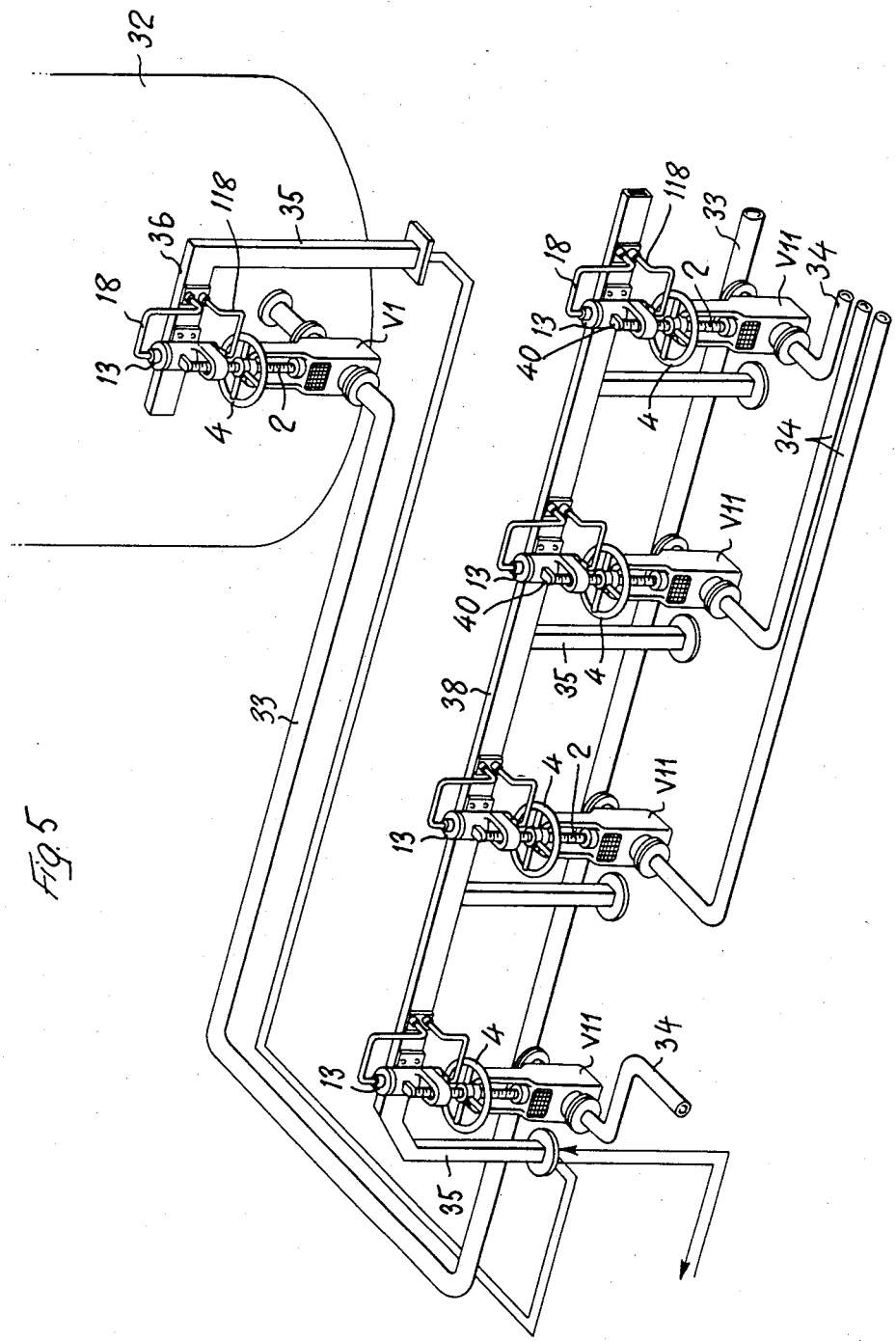

CONTROL DEVICE FOR VALVES AND THE LIKE

SUMMARY OF THE INVENTION

This invention relates to valves, and more particularly to the cutoff valves arranged in the piping systems of distribution and/or feeding networks for liquid or gaseous fluids, and its object is to provide a control device for said valves, with at least one control switch inserted in at least one conductor, preferably an optical conductor, and connected to the control means for the valve, so that it is actuated (i.e. opened or closed) automatically upon the actuation (i.e. opening or closing) of said valve, thus either interrupting the respective conductor or restoring its continuity. This conductor may be included in any warning and/or control circuit, and the opening or the closing of said switch will produce a signal which may be used for any desired purpose, such as for detecting and/or recording the actuation of the valve and, if desired, for activating a television inspection system permitting to see the person that is actuating the valve.

A control device of this type is known from EP-A-O 203 498. This invention aims to further improve the control devices of this kind and, especially, to further increase their reliability and sensitivity and to make the unauthorized actuation or tampering with the valve still more difficult and practically impossible.

In view of this object, according to the present invention, the control switch comprises a connector, particularly for an optical fibre, with two complementary and co-axial connector members, one of them being stationary and the other being movable axially and urged towards one of its end positions (i.e. opening or closing position) by a spring, and being held in the other end position (i.e. closing or opening position) by an associated movable member of the actuating means for the valve, in the position assumed by this member on completion of its stroke for closing or opening the valve.

Preferably, according to a further characteristic of the invention, the control switch is actuated by the associated movable member of the actuating means for the valve through any suitable step-up mechanism which appreciably amplifies the movement of said movable actuating member. Thus, even a small or very small movement of said actuating member just at the beginning of the actuation of the valve causes with certainty either the connection or disconnection of said connector and, therefore, the activation of the circuit which is controlled by said switch.

According to a further improvement of the invention, the control switch is operatively coupled to the associated movable member of the valve actuating means in such a manner that its displacement, even if very small, from a pre-established assembling position will cause automatically the actuation of the switch to activate the associated warning and/or control circuit.

In a preferred embodiment, the control switch is mounted in a covered manner on the inner side of a switch-bearing member constructed in the form of a box or casing and fixed to the valve body in a protected position wherein the switch and/or control means therefore are inaccessible, whereas it may be separated from the valve body and/or may be moved away therefrom to an inspection position wherein the switch and/or its actuating means may be reached, said switch being constructed and coupled to its actuating member of the valve actuating means in such a manner as to automatically cause the actuation of the control switch and the activation of the circuit actuated thereby when said switch-bearing member is separated from the valve body and/or moved from the protected position towards the inspection position.

When the device of the invention is applied to a valve which is actuated through an axially-movable stem, the control switch is actuated preferably—according to a further characteristic of the invention—through a translation lever by a lever-tripping member which is secured to the valve stem, or—in a modified embodiment—by the free end of the valve stem. Therefore, the control device may be applied to a great deal of different types of valves with no need to adapt (i.e. to personalize) said device each time to a particular type of valve. Moreover, particularly when the control switch is actuated by the free end of the valve stem, there is no need to effect major adjustments on the valve or even a simple disassembling and re-assembling of any portions thereof.

The control switch may be mounted on any suitable support, for example, on the valve body, or on a switch-bearing member secured to the valve body, or on a suitable supporting structure in the proximity of the valve and independent therefrom. This supporting structure may be constructed as desired and, in a particular case of a row of two or more valves, it may comprise at least a beam-like structure extending along the row of valves and having the individual control switches secured thereto. According to a further characteristic of the invention, said beam-like structure may be of tubular configuration and may accommodate therein the electrical or optical conductors that are connected to the control switches.

BRIEF DESCRIPTION OF THE DRAWINGS

Some exemplary embodiments of the invention, as applied to valves having an axially-movable, threaded and rotatable stem, will be described with more detail hereinafter with reference to the accompanying drawings, wherein:

FIG. 3 is a cross-sectional view on the line III—III of FIG. 1.

FIG. 4 shows a control connector according to the invention, one half thereof being shown in side elevational view and the other half in axial sectional view.

FIG. 5 is a perspective view of a group of valves each provided with a control switch according to the invention.

DESCRIPTION OF THE PREFERRED EMBODIMENTS

Figure 1:
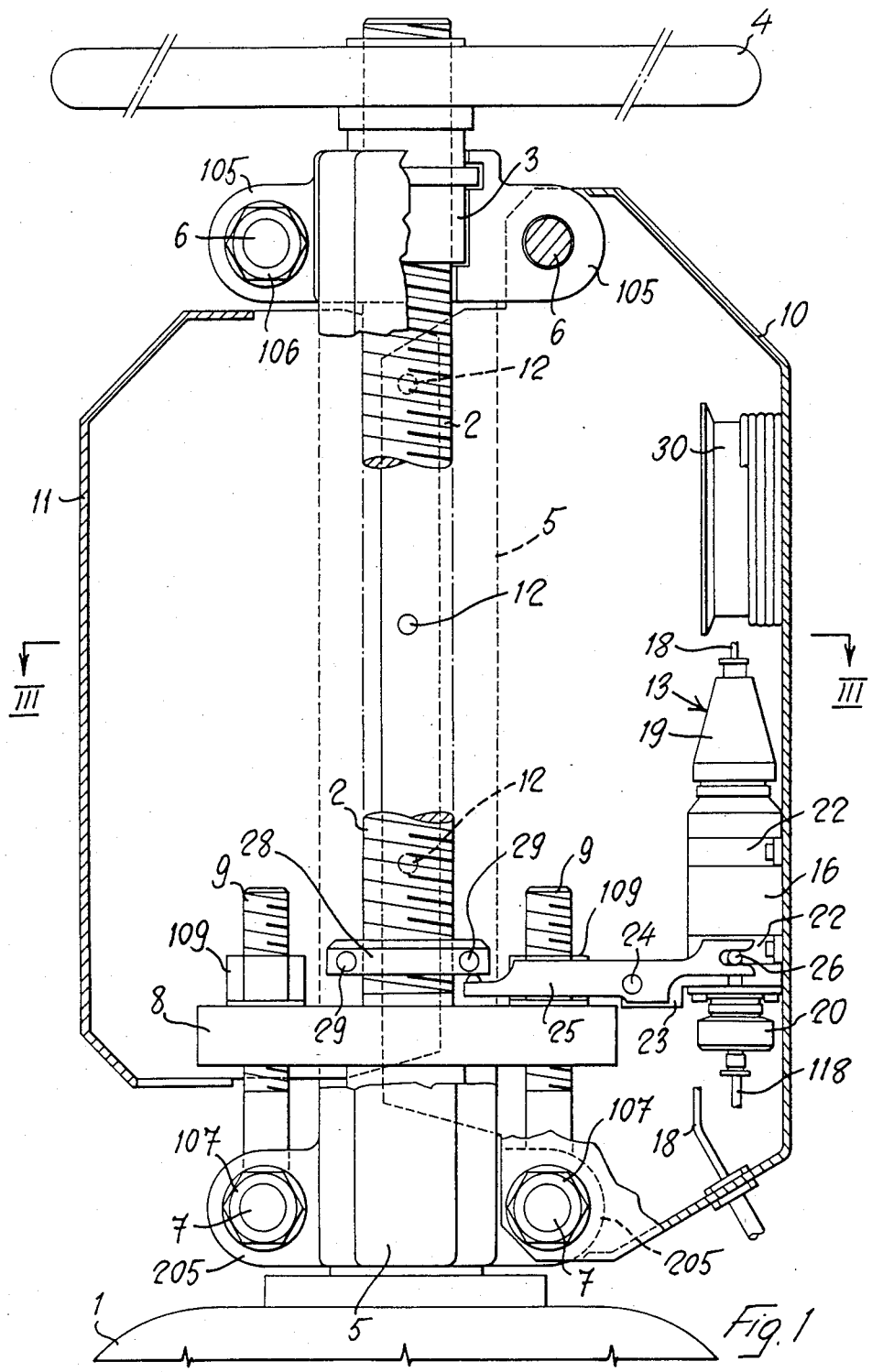
FIG. 1 shows the upper portion of a valve, with the control device in side elevational and partly sectional view on the line I—I of FIG. 3.
Figure 2:
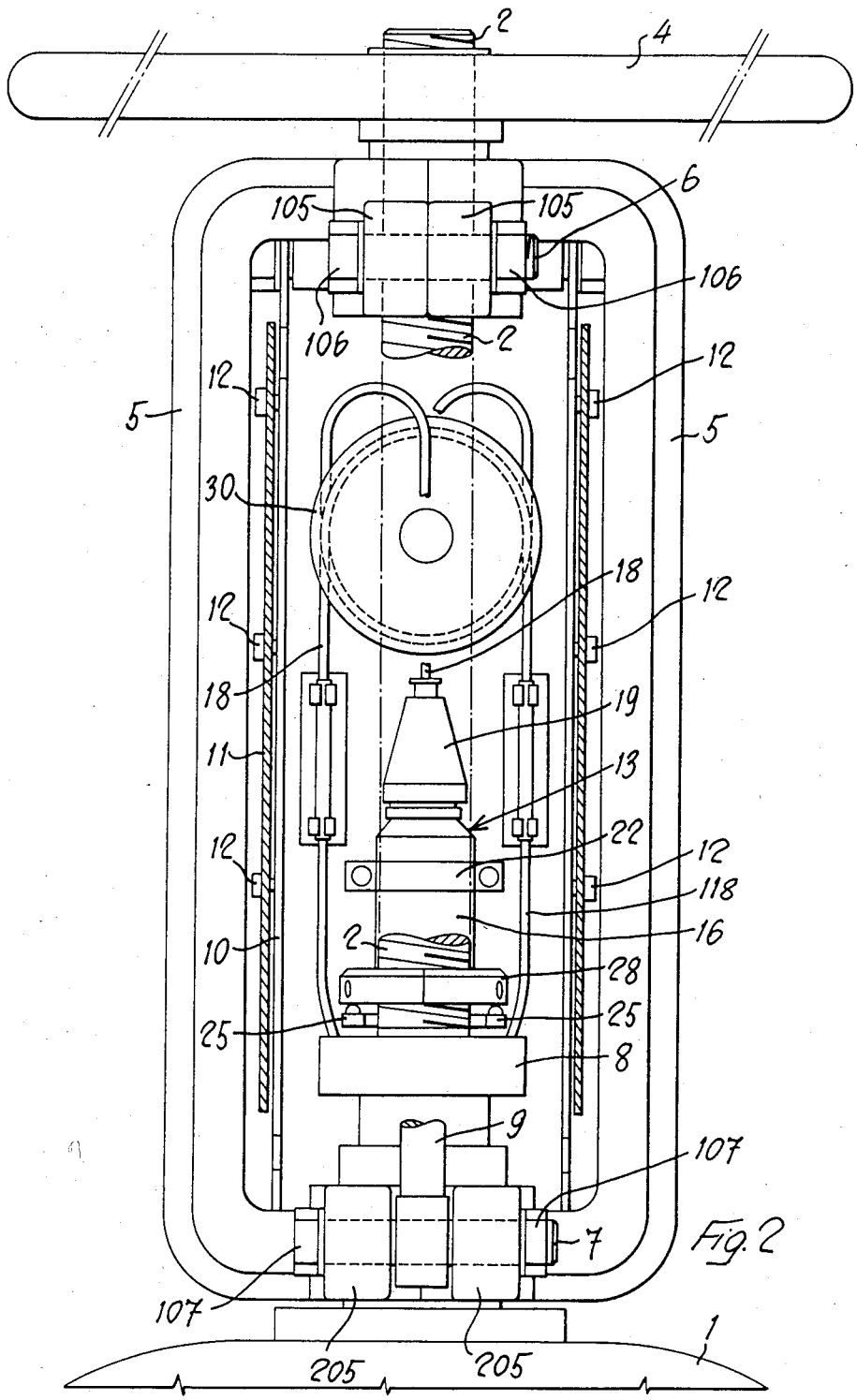
FIG. 2 shows the upper portion of the valve, with the control device in sectional view on the line II—II of FIG. 1 and with the valve stem partially omitted.

In the FIGS. 1 to 3, the numeral 1 indicates the body of a valve which is controlled by a threaded stem 2 engaged in a corresponding nut-member 3. The nut-member 3 is connected to an actuating handwheel 4 and is accommodated, in a rotatable but not axially movable manner, between the upper ends of two brackets 5 the upright portions of which extend parallelly to the valve stem 2. These brackets 5 are connected to each other at their upper ends by means of two opposite pairs of side lugs 105 which are tightened to each other by means of threaded through-bolts 6 and respective nuts 106. At their lower ends, said brackets are connected to each other and to the valve body 1 by means of two additional opposite pairs of side lugs 205 which are tightened to each other by means of threaded through-bolts 7 and respective nuts 107.

The stem 2 enters the valve body 1 through a stuffing box 8 which is secured to the valve body 1 and is maintained in its sealing condition by two threaded bolts 9 and respective nuts 109. The two bolts 9 are pivotably connected to the corresponding bolts 7 at the lower ends of the brackets 5 through suitable eyes, between said lugs 205 of said brackets 5.

In the type of valve described above, by rotating the nut-member 3 by means of the actuating handwheel 4, said threaded stem is moved axially to actuate the valve member (not shown) of said valve. With the stem 2 in its completely lowered position, FIGS. 1 and 2, the valve is closed; in order to open the valve, the handwheel 4 is to be rotated so as to lift the stem 2.

According to the invention, said valve is provided with a casing which encloses the stem 2 substantially at the portion thereof between the brackets 5. Said casing comprises two complementary box-like members 10 and 11 extending along the stem 2 and each having, in sectional view across the stem, a U-shaped configuration. The open sides of these two U-shaped box-like members 10, 11 are facing towards each other and are inserted into each other within said brackets 5.

The two box-like members 10, 11 are secured to each other by means of screws 12 which connect together the overlapping portions of the two members.

A connector/switch 13 for optical conductors, to be described with more detail hereinafter, is mounted on the inner side of the box-like or connector-bearing member 10. The connector-bearing member 10 is secured to an upper bolt 6 and to a lower bolt 7 (used to hold the brackets 5 together) by means of corresponding extensions of its side walls, and, if required, with the aid of spacer rings 114 (FIG. 3). The assembly is constructed and sized so that when said casing is fixed by means of its connector-bearing member 10 in the so-called protected position, the bolts 6 and 7 of the brackets 5, the overlapping inter-engaged portions of the two box-like members 10 and 11 of said casing and the associated securing screws 12 will be located between the brackets 5 and will be covered by said brackets so as to be inaccessible from the outside, as appreciated from the drawings, and particularly from FIG. 3.

The connector 13 comprises two complementary co-axial portions 14 and 15 coupled with each other and accommodated within a housing 16. The upper portion 14 of the connector 13 is firmly secured to the housing 16, while the lower portion 15 is supported by a bushing 116 which is axially movably guided within said housing 16. The stroke of the slidable bushing 116, and therefore of the movable lower portion 15 with respect to the stationary upper portion 14, is established, preferably, of an extent which is just sufficient to interrupt and to re-establish the connection through the connection 13. To achieve this objective, the movable lower portion 15 of the connector 13 need not be completely disengaged from the corresponding stationary upper portion 14.

In the exemplary embodiment illustrated herein, the slidable bushing 116 supporting the movable lower portion 15 of the connector 13 is urged by a strong spring 17 axially downwards and, due to the action of said spring 17, tends to move to a connector opening position, i.e. a position wherein the connection established through the connector 13 is interrupted.

The connector 13 is inserted between two branches 18, 118 of a conductor, which may be an electrical conductor, though preferably, and particularly in the illustrated example, it is an optical conductor (optical fibre). The branch 18 of the conductor is connected to the stationary upper portion 14 of the connector 13 and is passed sealingly through a closure cap 19 which is mounted on the top of the housing 16. The branch 118 of the conductor is connected to the movable lower portion 15 of the connector 13 and is passed sealingly through a bottom member 20 which is mounted on the lower end of the slidable bushing 116. An annular seal 21, for example of the O-ring type, ensures a sealed relationship between the housing 16 and the slidable bushing 116. Thus, the two portions 14, 15 of the connector 13 and their inter-engagement region are carefully protected against moisture and dust.

The housing 16 of the connector 13 is fixed to the connector-bearing member 10 of said casing by means of straps 22 and is provided with an extension 23 projecting towards the stem 2 of the valve. The rear fork-shaped portion of a displaceable lever 25 is fulcrumed to said extension 23 by means of two co-axial side studs 24. Engaged within end cutouts in the arms of the rear portion of said lever 25 are two co-axial side studs 26 which are secured to the slidable bushing 116 and protrude out of the housing 16 through registering longitudinal side slots 27 in said housing 16. The front portion of the lever 25 is also fork-shaped and the two arms thereof straddle the bolt 9 of said stuffing box 8 and co-operate with the undersurface of a lever-pushing disc 28 which is secured to the stem 2 of the valve. Said lever-pushing disc 28 may be comprised of two complementary half-rings which are threaded matingly with the threading of said valve stem 2 and are locked to said stem by means of screw 29 interconnecting said two half-rings.

Above the connector 13, within the connector-bearing member 10, there is arranged a small drum 30; a certain length of the two optical conductors 18, 118 is wound around said drum 30 before passing out of the casing formed by the two box-like members 10, 11.

The control device described above is mounted as follows: the connector 13 complete with the lever 25 is first mounted on the inner side of the connector-bearing member 10. The two box-like members 10, 11 are then mounted on the valve by inserting one of its open sides into the other between the two brackets 5 while both box-like members 10, 11 are displaced rightwards as seen in FIGS. 1 and 3 to such an extent that their side overlapped regions are located out of the brackets 5 and, therefore, are uncovered and accessible. While the members 10, 11 are in this position, the connecting screws 12 are applied thereto, whereafter the casing formed by the two box-like members 10, 11 is moved back to its centered position with respect to the valve stem 2, i.e. to its final position shown in the FIGS. 1 and 3, and is locked thereat by fixing the box-like member 10 to the lugs 105, 205 of the brackets 5 by means of the bolts 6 and 7. In this final position, the side screws 12 connecting the two box-like members 10, 11 forming the casing will be covered by the brackets 5 and, therefore, will be inaccessible, and the lever 25 will be engaged, at its fork-shaped front end, under the lever-pushing disc 28.

In the closed position of the valve, the lever-pushing disc 28 is in its lowered condition, together with the valve stem 2, in a position wherein it pushes the front end of the lever 25 downwards, thus lifting its rear end which, in turn, lifts the bushing 116 together with the movable lower portion 15 of the connector 13 against the action of the spring 17, thus closing the connector 13. The closing of the connector 13, therefore, will signal the closing of the valve to the warning and control circuit. At the beginning of an opening movement of the valve, the lever-pushing disc 28 moves with the valve stem 2 just a bit upwards (for example, 1 to 5 mm) and, therefore, permits the rear end of the lever 25 to be lowered together with the bushing 116 and movable portion 15 of the connector 13 by the action of the spring 17 to such an extent to open the connector 13. On proceeding further with the opening of the valve, the lever-pushing disc 28 is further moved upwards together with the valve stem 2, and is moved away from the associated front end of the lever 25 because the further angular movement of said lever by the action of the spring 17 is prevented by a suitable stop means, for example, by the abutment of the slidable bushing 116 against the bottom 216 of the housing 16. This stop means, therefore, limits the axial opening movement of the connector 13 effected by the slidable bushing 116 and movable lower portion 15 of said connector 13, so as to stop the lever 25 after a small angular movement thereof by the action of the spring 17, whereby said lever-pushing disc 28 may raise together with the stem 2 to the full opened position of the valve. The opening of the connector 13, therefore, signals to the warning and control circuit the opening of a valve and even a very little initial movement of the valve control members in the valve opening direction, even if an appreciable amount of fluid cannot yet flow through said valve. In the completely closed position of the valve, the lever-pushing disc 28 will be lowered again to the position shown in the FIGS. 1 and 2 to engage the front end of the lever 25 and push it downwards, thus lifting its rear end to urge upwards the slidable bushing 116 and the movable portion 15 of the connector 13 in order to close the latter against the action of the spring 17.

In order to dismantle the control device, particularly to tamper with it to reach the connector 13 and lock it in its closed position and effect an unauthorized opening of the valve, the box-like member 10 is to be disconnected from the bolts 6, 7 of the brackets 5, whereafter the entire casing 10, 11 is to be displaced with respect to the brackets 5 rightwards as seen in FIGS. 1 and 3, so as to expose the side screws 12 which connect the two box-like portions 10, 11 and to disconnect these portions. However, said displacement of the casing 10, 11 with respect to the brackets 5 causes automatically the disengagement of the front end of the lever 25 from the lever-pushing disc 28, whereby the spring 17 will be allowed to displace the slidable bushing 116 and the movable portion 15 of the connector 13 downwards to the opened position of said connector. Any dismantling, either authorized or unauthorized, of the valve control device is thus communicated automatically to the warning and control circuit.

FIG. 5 shows some valves VI, VII comprised, for example, in a system for distributing and dispensing a liquid product, such as mineral oil, gasoline, or the like. The valve VI is inserted between the reservoir 32 for the liquid and a main piping 33, while the valves VII are inserted between the main piping 33 and the branched pipes 34 and are arranged in a row along a length of the mainpiping 33. All the valves VI, VII are of the type comprising a threaded control stem 2 engaged in a corresponding nut-member (not shown) secured to a control handwheel 4 and rotatable but not axially movable in the top member 37 of the valve body. Again, by rotating the nut-member by means of the actuating handwheel 4, the threaded stem 2 is moved axially and operates the valve member (not shown). In the completely lowered position of the stem 2, shown with solid lines in FIGS. 6 and 7, the valve is closed; in order to open the valve, the handwheel 4 is to be rotated in a direction to lift the stem 2, the final top position of which (fully opened valve) is shown with dot and dash lines in FIGS. 6 and 7.

Each valve VI, VII has associated therewith a control switch 13 which is connected through a pair of optical conductors 18, 118 to a warning and/or control circuit (not shown). In the exemplary embodiments shown in the FIGS. 6 to 8, the control swtich 13 is also comprised of a connector which is constructed as described above with reference to FIG. 4.

The control switch 13 associated to each valve VI, VII is secured to a supporting structure arranged aside the valve and independent therefrom. In the case of the single valve VI, said supporting structure comprises at least a post 35 fixed to the floor or the ground and including a top cross member or head 36 having secured thereto the control switch 13. However, in the case of the valves VII arranged in a row, the control switches 13 associated to said valves VI are secured to a common supporting structure formed by a beam-like member 38 extending along the row of valves VII and supported by a plurality of posts 35. The beam-like member 38 is, preferably, of tubular configuration and accommodates therein the optical conductors 18, 118 which are connected to the various control switches. These conductors may then be passed through the interior of one of the posts 35, which is of tubular configuration, to be connected to any warning and/or control circuit. On the side remote from the valves VII, the tubular beam-like member 38 may be formed with openings provided with covers 138 to reach the interior thereof in order to make and/or check the connections of the conductors 18, 118. Similarly, the cross member 36 and post 35 of the structure associated to the single valve VI may also be made of tubular configuration.

Each control switch 13 is fixed to the supporting structure in such a manner that the free end of its actuating lever 25 may co-operate, either directly or indirectly, with the upper end of the stem 2 of the valve VI, VII associated therewith. Said fixing of the control switch 13 to the respective supporting structure may be effected in any desired manner. In the embodiment according to the FIGS. 5 and 6, the control switch 13 is accommodated and secured in a vertical switch-bearing sleeve 39 which is fixed to the cross-member 36 or to the beam-like member 38 by means of side lugs.

Fixed to the top end of the stem 2 for the valve VI, VII is a lever-pushing cap 40 provided with a lateral arm 140 extending towards the control switch 13 above the free end of its actuating lever 25. A pushing screw 41, co-operating from above with the free end of the actuating lever 25 protruding from the switch-bearing sleeve 39, is screwed through said arm 140 of the cap 40. Said switch-bearing sleeve 39 comprises, on its front and facing towards the associated valve VI, VII, an annular, horizontal, protective extension 139 encircling the front end of the actuating lever 25 and the top end of the valve stem 2 and respective lever-pushing cap 40.

In the lowered or valve-closing position of the stem 2 (which position is shown with solid lines in FIG. 6), the lever-pushing cap 40 secured to the top end of the stem 2 is received in the protective annular extension 139 of said switch-bearing sleeve 39 and assumes such a position to push, by means of its arm 140 and pushing screw 41, the free front end of the actuating lever 25 downwards, so as to lift its rear end which, in turn, lifts the bushing 116 of the control switch 13 against the action of the spring 17, thus closing the switch 13. Therefore, the closing of the control switch 13 will signal the closing of the respective valve VI, VII to the warning and control circuit. At the beginning of an operation for opening the valve VI, VII, when the lever-pushing cap 40 moves with the valve stem just a bit upwards (for example, 1 to 5 mm), it permits the rear fork-shaped end of the actuating lever 25 to be lowered together with the bushing 116 and movable connector 15 of the switch 13 by the action of the spring 17 to such an extent to open said switch 13. On proceeding further with the opening of the valve, the lever-pushing cap 40 is further moved upwards together with the valve stem 2, so that it will get out of the annular extension 139 of the switch-bearing sleeve 39 and will move away from the associated front end of the actuating lever 25 because the further angular movement of said lever 25 by the action of the spring 17 is prevented by a suitable stop means, for example, by the abutment of the sliding bushing 116 of the switch 13 against the bottom 216 of the housing 16. This stop means, therefore, limits the axial opening movement effected by the slidable bushing 116 and movable lower connector member 15 and stops the actuating lever 25 after a small angular movement thereof by the action of the spring 17, thus permitting the lever-pushing cap 40 to raise together with the stem 2 to the full opened position of the valve, as shown with dot-and-dash lines in FIG. 6. The opening of the switch 13, therefore, signals to the warning and control circuit the opening of the valve VI, VII and even a very little initial movement of the valve control members 2, 4 in the valve opening direction, even if an appreciable amount of fluid cannot yet flow through said valve. In the completely closed position of the valve VI, VII, the lever-pushing cap 40 will be lowered again to the position shown with solid lines in FIG. 6, wherein it is received within the annular protective extension 139 of the switch-bearing sleeve 39 and through its arm 140 and pushing screw 41 it engages the front end of the actuating lever 25 to push it downwards and lift its rear end so as to urge the slidable bushing 116 and movable lower connector member 15 upwards to the closed position of the control switch 13 against the action of the spring 17. The adjustment of the device is effected by screwing or unscrewing the pushing screw 41.

Figure 6:
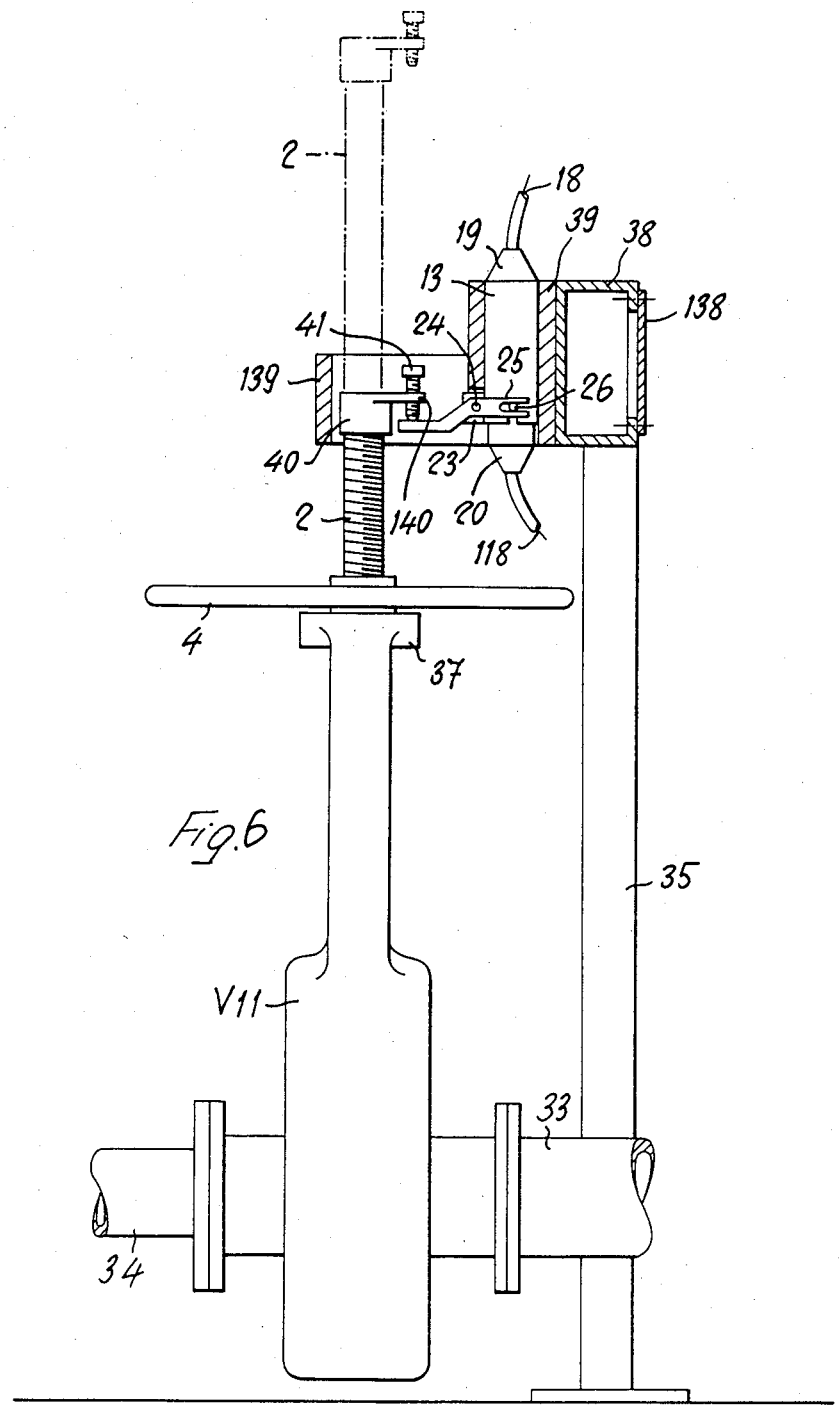
FIG. 6 is an elevational view on a larger scale of the valve of FIG. 1, with the associated control switch secured to a partly-sectioned supporting structure.
Figure 8:
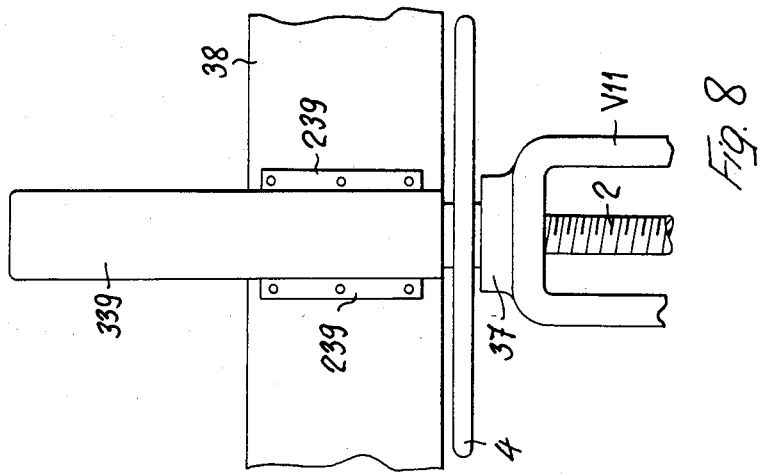
FIGS. 7 and 8 are vertical sectional and front elevational views, respectively, of a modified embodiment, with a control switch enclosed in a protective box.
Figure 7:
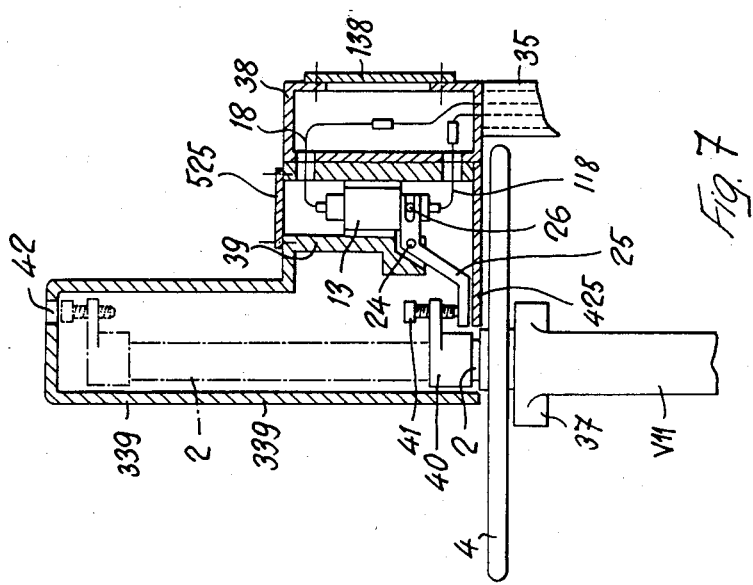

The embodiment according to FIGS. 7 and 8 differs from the embodiment described above with reference to FIGS. 5 and 6 mainly because of the different construction of the means for securing the control switch 13 to the supporting structure therefor, such as the beam-like member 38. In effect, in the FIGS. 7 and 8, the switch-bearing sleeve 39, which is fixed to the beam-like member 38 by side flanges 239, comprises—instead of the annular protective extension 139—a vertical cylindrical protective extension 339 in registry with the stem 2 of the valve VI, VII.

This vertical cylindrical protective extension 339 receives the protruding front end of the actuating lever 25 and permits the lever-pushing cap 40 fixed to the top of the valve stem 2 to move throughout its stroke, as appreciated from the lowered, valve-closing position shown with solid lines in FIG. 7, and from the raised, valve-opening position shown with dot-and-dash lines in the same FIG. 7. The cylindrical protective extension 339 is closed at the top (excepted, if desired, a hole 42 for reaching the pushing screw 41) and it may be closed also at the bottom by means of a bottom member 439 which extends below the bottom side of the switch-bearing sleeve 39 to reach the beam-like member 38. Thus, the valve stem 2, the control switch 13 and the actuating means therefor (i.e. the actuating lever and the lever-pushing cap 40) are enclosed within a protective casing which is fixed to the supporting structure.

In the embodiment according to FIGS. 5 and 6, the optical conductors 18, 118 project from the top and the bottom of the switch-bearing sleeve 39 and are inserted into the front side of the tubular beam 38 or the tubular cross-member 36 of the supporting structure aside of said sleeve 39 through suitable connectors. In the embodiment according to FIGS. 7 and 8, on the other hand, the optical conductors 18, 118 are led from the switch-bearing sleeve 39 through suitable holes in the rear wall thereof and registering holes in the front wall of the tubular beam 38, directly into said tubular beam 38. The switch-bearing sleeve 39 is provided with a top cover 539 permitting to reach the control switch 8.

Of course, the invention is not limited to the embodiments shown and described herein, but broad changes and modifications, especially of constructional nature, may be made thereto, for example, by using electrical conductors rather than the optical conductors 18, 118, or by using different embodiments of the means for actuating the control switch by the action of the top end of the valve stem 2, or by using any other construction of the supporting structure for said control switch.

We claim:

1. A control device for a valve and the like, including at least one control switch (13) which is inserted in at least one electrical or optical conductor (18,118), and is connected to a valve actuating means in such a manner that it will be automatically actuated upon the opening and closing of the valve, thus interrupting the conductor (18,118) or re-establishing its continuity during the valve opening and closing movement, said conductor (18,118) being comprised in any warning and/or control circuit, and the opening or the closing position of said switch (13) generating a signal to detect and/or record the actuation of the valve and/or to activate a television inspection system, characterized in that said control switch (13) is formed by a connector including two complementary and co-axial connector members (14,15), one of which (14) is stationary and the other of which (15) is movable axially and is urged towards one of its open or close positions by a spring (17) and is held in the other of its open or close positions thereof (i.e. closing or opening position) by an associated movable portion (2) of the valve actuating means in the position assumed by said portion at the end of its stroke for closing or opening the valve, said device further including displaceable means operatively connecting said movable portion (2) to said movable connector member (15), said displaceable means serving to warn or detect any actuation of said valve actuating means.

2. A device according to claim 1, characterized in that said two complementary members (14,15) of the connector (13) are enclosed in a housing (16,116) comprising a stationary portion (16) enclosing the stationary member (14) of the connector, and a slidable portion (116) mounting the movable member (15) of the connector, at least one seal (21) being provided between the two portions (16,116) of said housing, and the conductors (18,118) connected to the two members (14,15) of the connector (13) being passed sealingly out of the respective portions (16,116) of said housing.

3. A device according to claim 1, characterized in that said control switch (13) is actuated by the associated movable portion (2) of the valve actuating means through a step-up mechanism (25) which reduces the stroke of said movable portion (2) of the valve actuating means.

4. A device according to claim 1, characterized in that the control switch (13) is mounted either on the valve body (1) or on a switch-bearing member which is secured to the valve body (1).

5. A device according to claim 1, characterized in that the control switch (13) is operatively coupled to the associated movable portion (2) of the valve actuating means in such a manner that its displacement, even of very small extent, from a pre-established mounting position causes automatically the actuation of the switch (13) in a direction to activate the warning and/or control circuit.

6. A device according to claim 1, characterized in that the control switch (13) is mounted in a covered manner on the inner side of a connector-bearing member (10) constructed in the form of a box or casing and fixed to the valve body (1) in a protected position wherein the control switch (13) and/or the control means (2,25,28) therefor are inaccessible, whereas it may be separated from the valve body (1) and/or displaced with respect thereto to be moved to an inspection position wherein the switch (13) and/or control means (2,25,28) therefor may be reached, said switch (13) being constructed and/or coupled to the respective control portion (2) of the valve actuating means in such a manner as to automatically cause the actuation of the control switch (13) and the activation of the circuit controlled thereby when the switch-bearing member (10) is separated from the valve body (1) and/or displaced from its protected position towards the inspection position.

7. A device according to claim 1, applied to a valve which is actuated through an axially-movable stem (2), characterized in that said control switch (13) is actuated through a tripping lever (25) by a lever-pushing member (28) secured to the valve stem (2).

8. A device according to claim 7, applied to a valve the actuating stem (2) of which extends between two brackets (5) secured to the valve body (1), characterized by a casing formed by two complementary halves (10,11) adapted to be introduced with their open sides between the valve stem (2) and the two brackets (5), the inner side of one (10) of said halves mounting the control switch (13) and the associated actuating lever (25), at least one of said halves (10,11) being fixed to the valve body (1) and/or to the corresponding bracket (5), screws (12) being provided to connect said two halves (10,11) to each other, said screws (12) being located, in the final assembled position of the casing, in the region between the valve stem (2) and the two brackets (5) and are covered by the latter to become inaccessible, while when said casing is in its displaced position to permit access to said connecting screws, the actuating lever (25) of the control switch (13) disengages from the lever-pushing member (28) which is fixed to the valve stem (2) and permits a spring (17) to trip the switch (13).

9. A device according to claim 8, applied to a valve wherein the two brackets (5) are connected to each other at both ends and on diametrically opposite sides by means of bolts (6), characterized in that at least one (10) of said halves (10,11) of the casing is fixed to the respective bolts (6) that connect said brackets (5) to each other.

10. A device according to claim 1, applied to a valve which is actuated through an axially movable stem (2), characterized in that said control switch (13) is operatively associated with the free end of said valve stem (2).

11. A device according to claim 10, characterized in that the control switch (13) is actuated by a pivotable lever (25) one end of which co-operates through an adjustable pushing screw (41) with a radial extension (140) of a lever-pushing cap (40) secured to the top end of said valve stem (2).

12. A device according to claim 1, characterized in that said control switch (13) is fixed to a supporting structure (35,36 35,38) provided in proximity of the valve (VI,VII) and independent therefrom.

13. A device according to claim 12, characterized in that said supporting structure for the control switch (13) comprises at least one post (35) fixed to the floor or the ground and comprising at the top, aside the valve (VI,VII), a cross-member or head (36) for mounting the control switch (13).

14. A device according to claim 12, characterized in that in the event of a row of two or more valves (VII), the supporting structure for the respective control switches (13) comprises at least one beam (38) carried by one or more posts (35) and extending along the row of valves (VII), the individual control switches (13) being fixed to said beam (38).

15. A device according to claim 14, characterized in that at least one of said posts (35) and the head (36) or beam (38) of the supporting structure for the control switches (13) are hollow to permit the conductors (18,118) to be passed therethrough to be connected to the warning and/or control circuit.

16. A device according to claim 12, characterized in that said control switch (13) is accommodated in a corresponding switch-bearing seat (39) which is fixed to the supporting structure (36,38) and carries in addition the tripping means (25) for actuating said control switch (13).

17. A device according to claim 16, characterized in that said switch-bearing seat (39) comprises a protective annular extension (139) encircling the free end of said stem (2) of the valve (VI,VII) when said stem is in one of the open or close positions.

18. A device according to claim 16, characterized in that said switch-bearing seat (39) comprises a tubular protective extension (339) wherein the free end of the valve stem (2) may move.

19. A device according to claim 16, characterized in that said switch-bearing seat constitutes a closed protective casing which houses the control switch (13), said actuating means (25) and the free end of the stem (2).

* * * * *